US009365750B2

(12) United States Patent
Birkett et al.

(10) Patent No.: US 9,365,750 B2
(45) Date of Patent: Jun. 14, 2016

(54) ACCELERATORS FOR CURABLE COMPOSITIONS

(71) Applicants: Henkel Corporation, Rocky Hill, CT (US); Henkel Ireland Limited, Monheim (DE)

(72) Inventors: David P. Birkett, Kildare (IE); Anthony F. Jacobine, Meriden, CT (US); Andrew D. Messana, Newington, CT (US); Joel D. Schall, Hamden, CT (US); David Mullen, Navan Co. Meath (IE); Martin Wyer, Ontario (CA); Lynnette Hurlburt, Manchester, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 13/785,336

(22) Filed: Mar. 5, 2013

(65) Prior Publication Data

US 2014/0004353 A1    Jan. 2, 2014

Related U.S. Application Data

(60) Provisional application No. 61/664,793, filed on Jun. 27, 2012.

(51) Int. Cl.
*C09J 11/06* (2006.01)
*C09J 4/00* (2006.01)
*B32B 7/12* (2006.01)

(52) U.S. Cl.
CPC . *C09J 11/06* (2013.01); *B32B 7/12* (2013.01); *C09J 4/00* (2013.01); *Y10T 428/31551* (2015.04)

(58) Field of Classification Search
CPC ............ C09J 11/06; C09J 4/00; C09J 135/02; C09J 135/04; C09J 179/00; B32B 7/12
See application file for complete search history.

(56) References Cited

U.S. PATENT DOCUMENTS

| 3,218,305 | A | 11/1965 | Krieble |
| 3,991,008 | A | 11/1976 | Temin et al. |
| 4,039,705 | A | 8/1977 | Douek et al. |
| 4,180,640 | A | 12/1979 | Melody et al. |
| 4,287,330 | A | 9/1981 | Rich |
| 4,321,349 | A | 3/1982 | Rich |
| 4,554,301 | A | 11/1985 | Dohi et al. |
| 4,569,976 | A | 2/1986 | Zimmerman et al. |
| 5,605,999 | A | 2/1997 | Chu et al. |
| 6,043,327 | A | 3/2000 | Attarwala |
| 7,537,839 | B1 * | 5/2009 | Attarwala et al. ............ 428/463 |
| 8,598,279 | B2 | 12/2013 | Messana et al. |
| 8,609,881 | B2 | 12/2013 | Messana et al. |
| 9,243,083 | B2 | 1/2016 | Woods et al. |
| 2006/0189728 | A1 | 8/2006 | Qian |
| 2007/0040151 | A1 | 2/2007 | Utterodt et al. |
| 2010/0249266 | A1 | 9/2010 | Yarimizu et al. |
| 2012/0059083 | A1 * | 3/2012 | Tokui et al. .................. 523/118 |

FOREIGN PATENT DOCUMENTS

| CA | 2792861 | 9/2011 |
| CN | 101827870 | 9/2010 |
| CN | 102015882 | 4/2011 |
| CN | 102119149 | 7/2011 |
| WO | 2011119546 | 9/2011 |
| WO | 2011159137 | 12/2011 |

OTHER PUBLICATIONS

Rich, "Anaerobic Adhesives", Handbook of Adhesive Technology, 29, 467-79, A. Pizzi and K.L. Mittal, eds., Marcel Dekker, Inc., New York (1994), pp.

* cited by examiner

*Primary Examiner* — Robert Harlan
(74) *Attorney, Agent, or Firm* — Steven C. Bauman

(57) ABSTRACT

Benzoylthiourea or benzoylthiourethane derivatives as cure accelerators for curable compositions are provided.

13 Claims, No Drawings

ACCELERATORS FOR CURABLE COMPOSITIONS

BACKGROUND

1. Field

Benzoylthiourea or benzoylthiourethane derivatives as accelerators for curable compositions are provided.

2. Brief Description of Related Technology

Curable adhesive and sealant compositions oftentimes rely on curatives to make them commercially attractive options for end users. Curable adhesive and sealant compositions come in one part formats, two part formats and two step formats depending on the performance profile they are designed to meet and the constituents used to prepare the compositions. Anaerobic adhesives are prominent one part compositions and generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Anaerobic cure-inducing compositions ordinarily used in commercial anaerobic adhesive and sealant compositions to induce and accelerate cure ordinarily include saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g. U.S. Pat. Nos. 3,218,305 (Krieble), 4,180,640 (Melody), 4,287,330 (Rich) and 4,321,349 (Rich).

GC Corporation submitted to the U.S. Patent and Trademark Office a patent application, which published as U.S. Patent Application Publication No. 2010/0249266, and is directed to a polymerizable composition comprising a first paste and a second paste, where the first paste comprises a polymer of α,β unsaturated monocarboxylic acid or α,β unsaturated dicarboxylic acid, water, and a hydroperoxide as a peroxide, and where the second paste comprises a (meth) acrylate compound not having an acid group, fluoroaluminosilicate glass powder, a thiourea derivative as a reducing material, and a vanadium compound as a polymerization accelerator.

Notwithstanding the state of the technology, there is an on-going desire to find alternative technologies for accelerating the cure of curable compositions to differentiate existing products and provide supply assurances in the event of shortages or cessation of supply of raw materials. Accordingly, it would be desirable to identify new materials, which function as accelerators for curable compositions.

SUMMARY

Benzoylthiourea or benzoylthiourethane derivatives for use as accelerators for curable compositions are provided.

The curable compositions made with benzoylthiourea or benzoylthiourethane derivatives are useful as adhesives or sealants, particularly in one part systems where the cure mechanism is desirably an anaerobic one.

For instance, the benzoylthiourea or benzoylthiourethane derivatives may be within general structure I

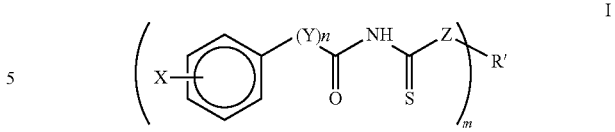

where Z is O or N—R, where R is selected from hydrogen, alkyl, alkenyl, hydroxyalkyl, hydroxyalkenyl, carbonyl, alkylene(meth)acrylate, carboxyl, or sulfonato, or R' is a direct bond attaching to the phenyl ring; R' is selected from hydrogen, alkyl, alkenyl, cycloalkyl, aryl, hydroxyalkyl, hydroxyalkenyl, alkylene- or alkenylene-ether, carbonyl, alkylene (meth)acrylate, carboxyl, nitroso or sulfonato; X is halogen, alkyl, alkenyl, hydroxyalkyl, hydroxyalkenyl, alkoxy, amino, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

A more specific general structure is shown below:

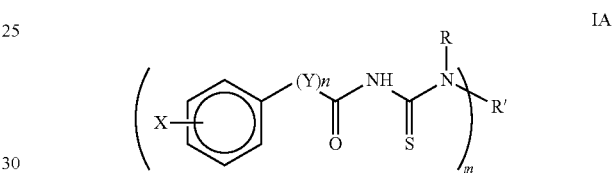

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene(meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

More specifically, the benzoylthiourea or benzoylthiourethane derivatives may be within structures II or IIA, respectively

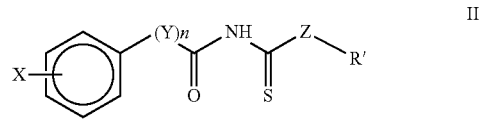

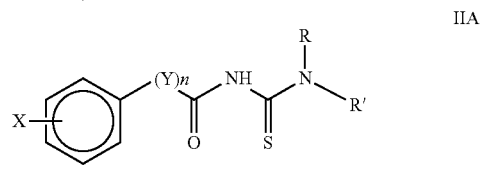

where R, R', Z, X, Y, and n are as defined above.

More specific examples of the benzoylthiourea or benzoylthiourethane derivatives within structures II and IIA, respectively, are set forth below

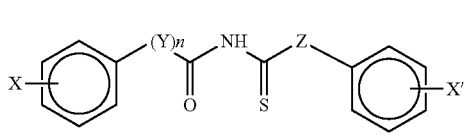

III

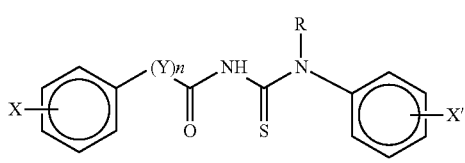

IIIA where R, X, Y, and n are as defined above, and X' is defined as X.

Alternatively, the benzoylthiourea or benzoylthiourethane derivatives within structure I may be a bis version, where R' is a linker. That is,

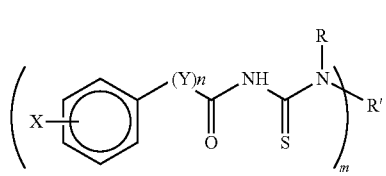

IV where R, R', X, Y, and n are as defined above, and m is 2.

The addition of these materials into curable compositions as a replacement for some or all of the amount of conventional cure accelerators surprisingly provides at least comparable cure speeds and physical properties for the reaction products formed therefrom.

Thus, also provided are curable compositions and cure systems prepared with such cure accelerators, methods of preparing and using the inventive cure accelerators and curable compositions, as well as reaction products of the curable compositions.

The benzoylthiourea or benzoylthiourethane derivatives act to accelerate cure of curable compositions and provide compositions with good cure through volume. The present invention will be more fully appreciated by a reading of the "Detailed Description", and the illustrative examples which follow thereafter.

DETAILED DESCRIPTION

Anaerobic curable compositions generally are based on a (meth)acrylate component, together with an anaerobic cure-inducing composition. Anaerobic cure accelerators are provided for use in the anaerobic cure-inducing composition, which in the case here are benzoylthiourea or benzoylthiourethane derivatives. The addition of such compounds as cure accelerators into anaerobic curable compositions as a replacement for some or all of the amount of conventional cure accelerators (such as APH), surprisingly provides at least comparable cure speeds and physical properties for the reaction products formed.

Here, such anaerobic cure-inducing compositions comprise the inventive cure accelerators within structure I

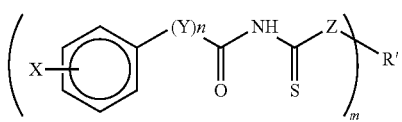

I where Z is O or N—R, where R is selected from hydrogen, alkyl, alkenyl, aryl, hydroxyalkyl, hydroxyalkenyl, alkylene (meth)acrylate, carbonyl, carboxyl, or sulfonato, and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene(meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

As noted above, a more specific general structure is shown below:

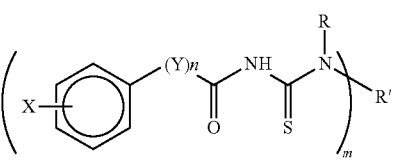

IA where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene(meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

More specifically, the inventive cure accelerators may be within structures II and IIA respectively

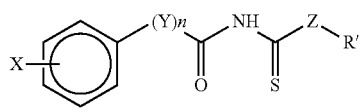

II

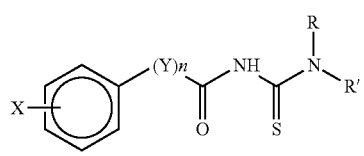

IIA where R, R', X, Y, and n are as defined above.

More specific examples of the inventive cure accelerator within structures II and IIA are set forth below

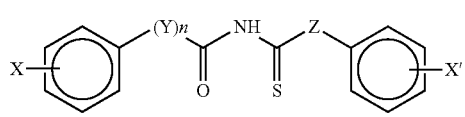

III

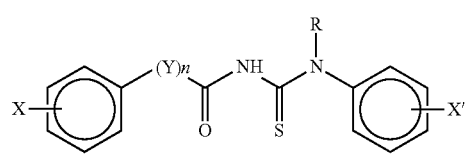

IIIA where R, X, Y, and n are as defined above, and X' is defined as X.

And even more specifically, the inventive cure accelerators include

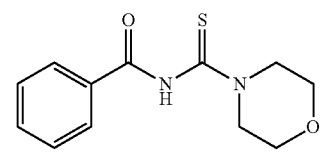

Benzoyl morpholinethiourea (BMTU)

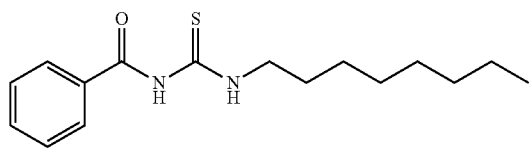

Benzoyl octylthiourea (BOTU)

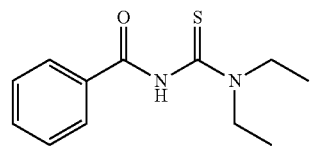

Benzoyl thiodiethylurea (BTDEU)

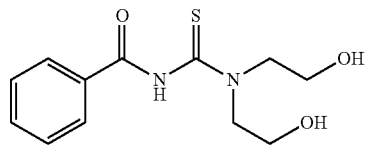

Benzoyl thiodihydroxyethylurea (BTDHEU)

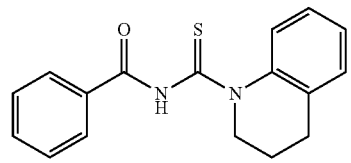

Benzoyl tetrahydroquinoline thiourea (BTHQTU)

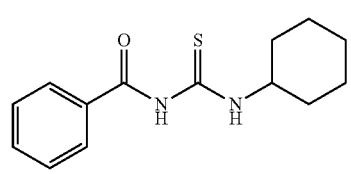

Benzoyl cyclohexylthiourea (BCHTU)

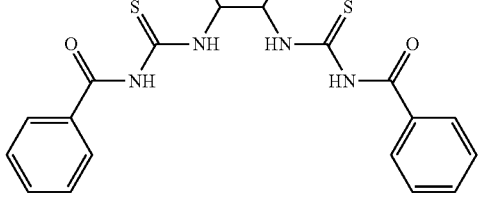

Cyclohexyl bis-Benzoylthiourea (CH bis-BTU)

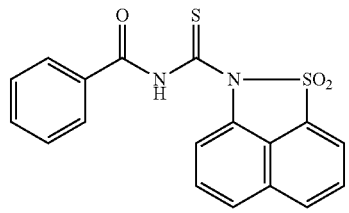

Benzoyl napthosultam thiourea (BNSTU)

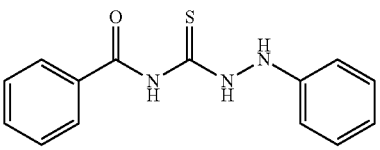

Benzoyl phenylhydrazide thiourea (BPHTU)

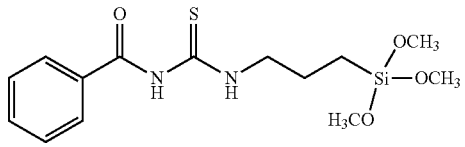

Benzoyl thiourea propyl trimethoxysilane (BTU-PTS)

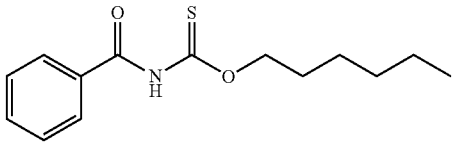

BTU-H Adduct

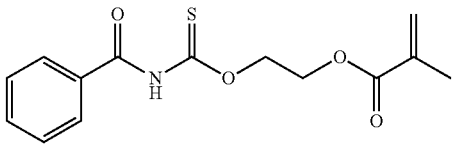

BTU-HEMA Adduct

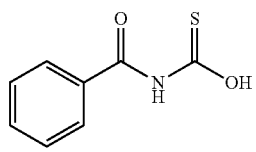

BTU-Water Adduct

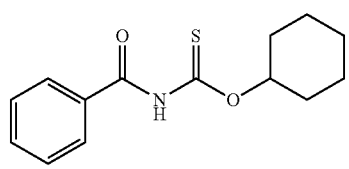

BTU-CH Adduct

-continued

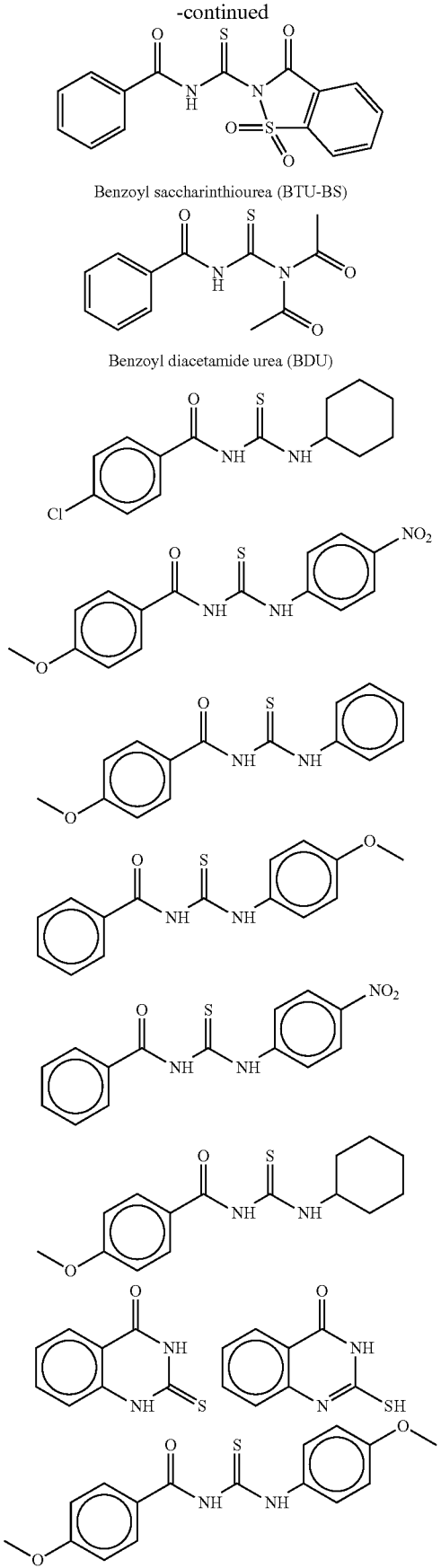

Benzoyl saccharinthiourea (BTU-BS)

Benzoyl diacetamide urea (BDU)

-continued

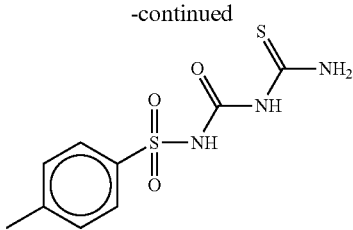

Benzoylthiourea or benzoylthiourethane derivatives are useful as a replacement for some of or all of the typically used cure accelerator(s). The benzoylthiourea or benzoylthiourethane derivatives display good solubility, stability and/or activity as cure accelerators in curable compositions and as primers in an appropriate delivery vehicle or carrier.

In one aspect, the invention provides an anaerobic curable composition, comprising:
(a) a (meth)acrylate component;
(b) an anaerobic cure-inducing composition comprising a peroxide and an anaerobic cure accelerator within structures I or IA below:

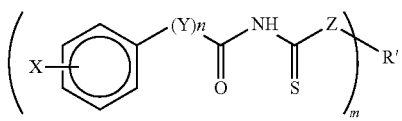

where Z is O or N—R, where R is selected from hydrogen, alkyl, alkenyl, aryl, hydroxyalkyl, hydroxyalkenyl, alkylene (meth)acrylate, carbonyl, carboxyl, or sulfonato, and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene(meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2;

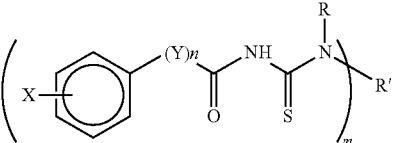

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene(meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

(Meth)acrylate monomers suitable for use as the (meth)acrylate component in the curable compositions may be chosen from a wide variety of materials, such as these represented by H$_2$C=CGCO$_2$R$^1$, where G may be hydrogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran(meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol)dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Additional components may be included in traditional curable compositions to alter the physical properties of either the curable compositions or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see U.S. Pat. No. 6,043,327, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The curable compositions may also include other conventional components, such as free radical initiators, other free radical co-accelerators, inhibitors of free radical generation, as well as metal catalysts, such as iron and copper. Depending on the cure environment some or all of these components might ordinarily be used, particularly if cure is to occur under anaerobic conditions.

A number of well-known initiators of free radical polymerization are typically incorporated into the curable compositions including, without limitation, hydroperoxides, such as cumene hydroperoxide ("CHP"), para-menthane hydroperoxide, t-amyl hydroperoxide, 1,1,3,3-tetramethylbutyl hydroperoxide and t-butyl hydroperoxide ("TBH"). Other peroxides include t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such free radical initiators are typically employed in the range of from about 0.1 to about 10 percent by weight, based on the total weight of the composition, with about 1 to about 5 percent by weight being desirable.

Stabilizers and inhibitors (such as phenols including hydroquinone and quinones) may also be employed to control and prevent premature oxidant decomposition and polymerization of the curable compositions.

In the context of anaerobic curable compositions, chelating agents [such as the tetrasodium salt of ethylenediamine tetraacetic acid ("EDTA")] to trap trace amounts of metal contaminants therefrom, may also be used. When used, chelators may ordinarily be present in the compositions in an amount from about 0.001 percent by weight to about 0.1 percent by weight, based on the total weight of the composition.

The benzoylthiourea or benzoylthiourethane derivatives may be used as cure accelerators in amounts of about 0.1 to about 5 percent by weight, such as about 1 to about 2 percent by weight, based on the total weight of the composition. When used in combination with conventional accelerators (though at lower levels as comparted to such conventional accelerators), particularly anaerobic curable compositions, the benzoylthiourea or benzoylthiourethane derivatives should be used in amounts of about 0.01 to about 5 percent by weight, such as about 0.02 to about 2 percent by weight.

Other agents such as thickeners, non-reactive plasticizers, fillers, toughening components (such as elastomers and rubbers), and other well-known additives may be incorporated therein where the art-skilled believes it would be desirable to do so.

Also provided are methods of preparing and using the inventive curable compositions, as well as reaction products of the compositions.

The curable compositions may be prepared using conventional methods which are well known to those persons of skill in the art. For instance, the components of the curable compositions may be mixed together in any convenient order consistent with the roles and functions the components are to perform in the compositions. Conventional mixing techniques using known apparatus may be employed. More specifically, in the context of anaerobic adhesive compositions, such as one in a one part format, a step of the method of preparing the composition includes mixing together a (meth) acrylate component and an anaerobic cure-inducing composition including the benzoylthiourea or benzoylthiourethane derivatives as an anaerobic cure accelerator.

The curable compositions may be applied to a variety of substrates to perform with the desired benefits and advantages described herein. For instance, in the context of anaerobic curable compositions, appropriate substrates may be constructed from steel, brass, copper, aluminum, zinc, glass and other metals and alloys, ceramics and thermosets.

The invention also provides a process for preparing a reaction product from the curable composition, steps of which include applying the composition to a desired substrate surface and exposing the composition to appropriate conditions for a time sufficient to cure the composition.

This invention also provides a method of using as an accelerator for curable compositions the so-described benzoylthiourea or benzoylthiourethane derivatives.

And the present invention provides a method of using the so-described benzoylthiourea or benzoylthiourethane derivatives as a replacement for some or all of the conventional accelerator used in curable compositions. Of course, the present invention also provides for a bond formed between two mated substrates with the curable composition using the so-described benzoylthiourea or benzoylthiourethane derivatives.

In view of the above description, it is clear that a wide range of practical opportunities is provided. The following examples are provided for illustrative purposes only, and are not to be construed so as to limit in any way the teaching herein.

EXAMPLES

Many of the so-described benzoylthiourea or benzoylthiourethane derivatives were synthesized as set forth below.

A. Syntheses

Benzoyl Isothiocyanate

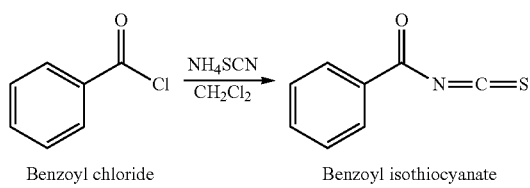

Benzoyl chloride          Benzoyl isothiocyanate

Benzoyl isothiocyanate was prepared as a starting material for benzoyl thiourea and derivates thereof. In a 500 mL three-neck round-bottom flask ("RBF"), fitted with a condenser, thermo-probe, sealed system nitrogen purge, pressure-equilibrated addition funnel and mechanical stirrer, were placed solid ammonium thiocyanate (16.9 g, 0.22 mol) and dichloromethane (100 mL). The stirred mixture was cooled in an ice-water bath to a temperature of about 10-15° C. To the stirred mixture was added a solution of benzoyl chloride (28.4 g, 0.2 mol) in dichloromethane (50 mL) over a period of time of 20 minutes and the reaction mixture was warmed to a temperature near reflux (39° C.) for a period of time of 1 hour. Reaction completion was confirmed by FT-IR analysis. The solution was then cooled to a temperature of about 10-15° C. The solution can be concentrated to an oil to provide the benzoyl isothiocyanate. A boiling point of 128-131° C. at 15 mm Hg was measured.

FT-IR, ATR-Accessory, 3063 cm$^{-1}$ (aromatic C—H), 2000-1921 (—NCS aromatic isothiocyanate), 1685 (carbonyl), 1230 (—C—N—), 846 (aromatic thioisocyanate).

$^1$H NMR—DMSOd$_6$, δ 8.05 (s, multiplet, aromatic H), 7.70 (s, triplet, aromatic H), 7.50 (s, triplet, aromatic H).

$^{13}$C NMR—DMSOd$_6$, δ 161.0 (s, singlet, Ar—CO—), 148.0 (s, singlet, —NCS), 135.0 (m, singlet, aromatic C), 130.0 (s, singlet, aromatic C), 128.0 (s, singlet, aromatic C).

Benzoylthiourea

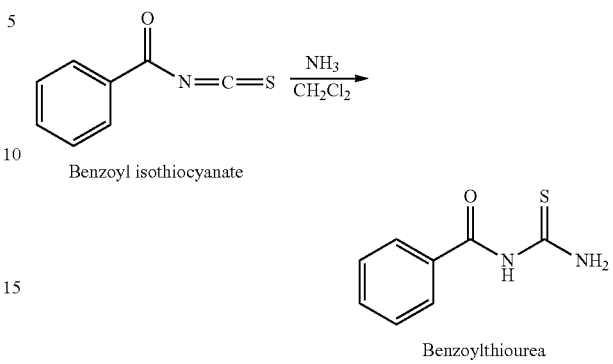

Benzoylthiourea

The RBF was changed to include a sealed glass-fritted bubbler system connected to an ammonia gas supply and an exit bubbler-scrubber system. To the clear cold reaction mixture (controlled at a temperature below 30° C. with an external ice-water bath) was slowly purged ammonia gas. During the addition, ammonia was consumed and the reaction mixture slowly became pale and cloudy/milky in appearance. The mixture was allowed to warm to room temperature, and stirring continued for an additional hour after ammonia addition ceases. Nitrogen gas was then re-introduced into the system to purge residual ammonia gas. The resulting solid is collected by vacuum filtration and washed with additional dichloromethane to provide a slightly yellow solid, which was recrystallized from ethanol. The solid was then dried to a constant weight in vacuo at a temperature of 50° C. and a pressure of <1 mTorr. The resulting solid was observed to have a melting point of 171.62° C., as determined by DSC.

FT-IR, ATR-Accessory, 3301-3146 cm$^{-1}$ (—NH$_2$ and —NH—), 1675 (carbonyl), 1599, 1526 and 1403 (—NCSN—), 1233 (—C—N—).

$^1$H NMR—DMSOd$_6$, δ 11.1 ppm (m, singlet, —NH—), 9.90 and 9.55 (m, doublet, —NH$_2$), 7.90 (s, doublet, aromatic H), 7.60-7.40 (s, multiplet, aromatic H), 3.65 (s, singlet, solvent exchange).

$^{13}$C NMR—DMSOd$_6$, δ 187.5 ppm (NH—CS—NH$_2$), 173.5 (Ar—CO—), 139.0-132.0 (aromatic C).

Benzoyl Thiourea Adducts Made from Amine- or Nitrogen-Containing Compounds

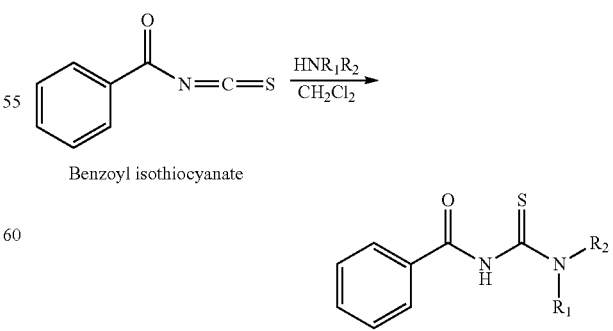

Benzoyl isothiocyanate

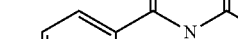

Benzoylthiourea Adduct

Benzoyl Morpholine Thiourea ("BMTU") Adduct

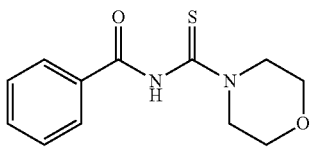

Benzoyl morpholinethiourea (BMTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point morpholine (13.21 g, 0.150 mol) and dichloromethane (100 mL) were added slowly over a period of time of about 30 minutes. The ice-water bath was removed and the reaction mixture was stirred overnight under a nitrogen purge. The reaction mixture was then concentrated in vacuo at a temperature of 40° C. to provide a crude yellow solid. The solid was recrystallized from refluxing ethyl acetate (50 mL) to provide a yellow solid that was dried to constant weight in vacuo at a temperature of 50° C. and a pressure of <1 mTorr in a 82% yield. The solid was determined to have a melting point of 138° C.

Benzoyl Octyl Thiourea ("BOTU") Adduct

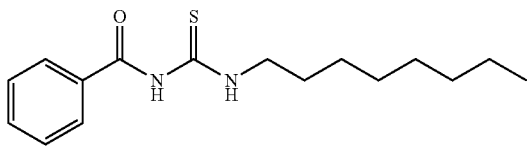

Benzoyl octylthiourea (BOTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath to a temperature of below 5° C., at which point octylamine (19.6 g, 0.150 mol) and dichloromethane (100 mL) was added slowly over a period of time of 30 minutes. The ice-water bath was removed and the reaction mixture was stirred at room temperature under a nitrogen purge overnight. The reaction mixture was washed with water, and the organic layer separated, dried with anhydrous magnesium sulfate, filtered and concentrated in vacuo at a temperature of 40° C. to provide an orange oil. The oil was dried to constant weight in vacuo at a temperature of 50° C. and a presence of <1 mTorr in a 95% yield.

Benzoyl Thiodiethylurea ("BTDEU") Adduct

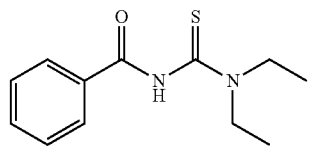

Benzoyl thiodiethylurea (BTDEU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point diethylamine (15.0 gg, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield.

Benzoyl Thiodihydroxyethylurea ("BTDHEU") Adduct

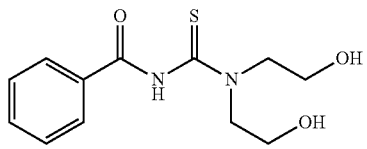

Benzoyl thiodihydroxyethylurea (BTDHEU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point dihydroxyethylamine (15.9 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 97% yield.

Benzoyl Tetrahydroquinoline Thiourea ("BTHQTU") Adduct

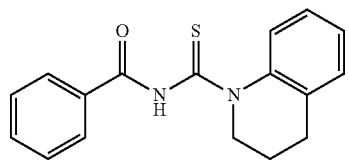

Benzoyl tetrahydroquinoline thiourea (BTHQTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point tetrahydroquinoline (20.4 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 93% yield. The solid was determined to have a melting point of 143.6° C.

Benzoyl Cyclohexythiourea ("BCHTU") Adduct

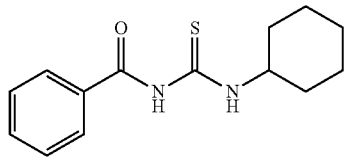

Benzoyl cyclohexylthiourea (BCHTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point cyclohexylamine (15.0 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield. The solid was determined to have a melting point of 67.8° C.

Cyclohexyl Bis-Benzoylthiourea ("CHbisBTU") Adduct

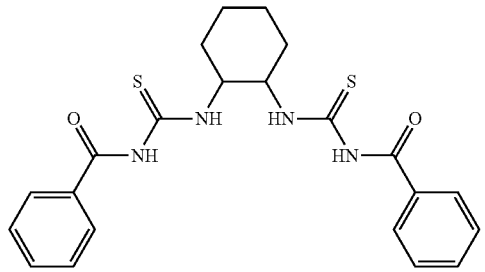

Cyclohexyl bis-Benzoylthiourea (CH bis-BTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point benzoyl isothiocyanate (50.0 g, 0.300 mol) and cyclohexyldiamine (17.42 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield.

Benzoyl Naphthosultamthiourea ("BNSTU") Adduct

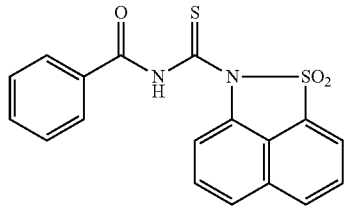

Benzoyl napthosultam thiourea (BNSTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point naphthosultam (31.4 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a brown solid. The brown solid was recrystallized from refluxing ethyl acetate (150 mL) to provide a tan solid that was dried to constant weight in vacuo at a temperature of 50° C. and a pressure of <1 mTorr in a 77% yield. The resulting solid was observed to have a melting point of 264° C.

Benzoyl Phenylhydrazinethiourea ("BPHTU") Adduct

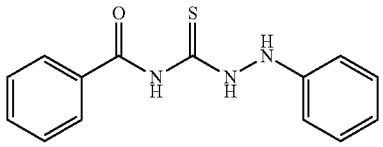

Benzoyl phenylhydrazide thiourea (BPHTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point phenylhydrazine (16.7 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 97% yield.

Benzoyl Thiourea Propyltrimethoxysilane ("BTU-TMS") Adduct

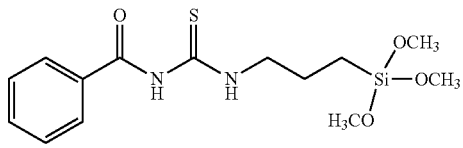

Benzoyl thiourea propyl trimethoxysilane (BTU-PTS)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The reaction mixture was cooled in an ice-water bath to a temperature below 5° C., at which point 3-aminopropyl trimethoxysilane (27.7 g, 0.150 mol) and dichloromethane (100 mL) were added slowly over a period of time of 30 minutes. The ice-water bath was removed and the reaction mixture was stirred at room temperature under a nitrogen purge overnight. The reaction mixture was then concentrated in vacuo at a temperature of 40° C. to provide a clear red liquid. The liquid was dried to constant weight in vacuo at a temperature of 50° C. and a pressure of <1 mTorr in a 97% yield.

Benzoyl Thiourea JEFFAMINE ("BTU-JEFFAMINE") Adduct

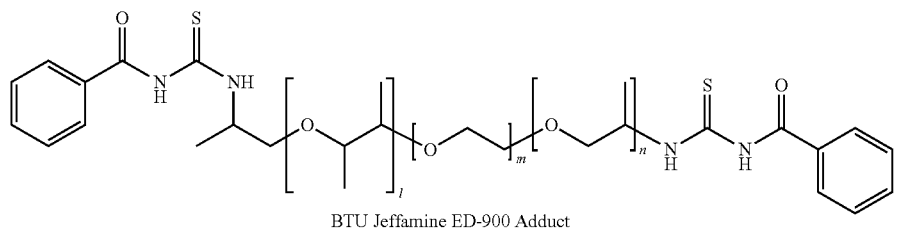

BTU Jeffamine ED-900 Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The reaction mixture was cooled in an ice-water bath to a temperature below 5° C., at which point JEFFAMINE ED-900 (67.5 g, 0.075 mol) and dichloromethane (100 mL) was added slowly over a period of time of 30 minutes. JEFFAMINE ED-900, according to the manufacturer Huntsman Corporation, Woodlands, Tex., is a polyether diamine based on a predominantly PEG backbone, with a molecular weight of 900. In the structure given above, 1 is about 12.5, and m+n is about 6.

The ice-water bath was removed and the reaction mixture was stirred at room temperature under a nitrogen purge overnight. The cloudy solution was then concentrated in vacuo at a temperature of 40° C. to provide a pale amber oil. The liquid was dried to constant weight in vacuo at a temperature of 50° C. and a pressure of <1 mTorr in a 99% yield.

Benzoyl Saccharin Thiourea ("BSTU") Adduct

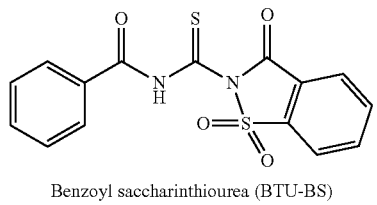 [SMILES: O=C(NC(=S)N1C(=O)c2ccccc2S1(=O)=O)c1ccccc1]

Benzoyl saccharinthiourea (BTU-BS)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) and saccharin (28.1 g, 0.150 mol) followed by dichloromethane (100 mL). The mixture was cooled in an ice-water bath at a temperature below 5° C., at which point water (28.1 g, 0.150 mol) and acetone as the solvent and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a solid that was dried to constant weight in vacuo at a temperature of 50° C. and a pressure of <1 mTorr in a 37% yield.

Benzoyl Diacetamide Thiourea ("BDTU") Adduct

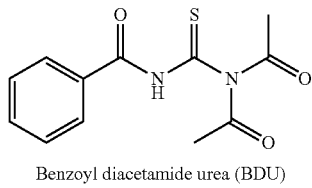 [SMILES: CC(=O)N(C(C)=O)C(=S)NC(=O)c1ccccc1]

Benzoyl diacetamide urea (BDU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point diacetamide (15.3 g, 0.150 mol) and acetone as the solvent and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. and then dried to constant weight in vacuo at a temperature of 50° C. and a pressure of <1 mTorr.

para-Toluene Sulfonyl Thiourea ("PTSTU") Adduct

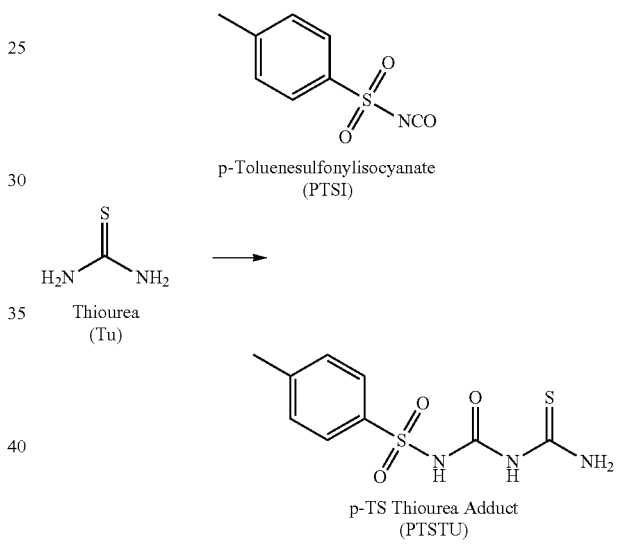

In a 100 mL RBF equipped with a condenser, thermo-probe, sealed system nitrogen purge, pressure-equilibrated addition funnel and magnetic stirrer were placed thiourea (9.36 g, 0.12 mol) and dioxane (50 mL). The mixture was warmed to a temperature of 100° C. to encourage dissolution. The mixture was then cooled to a temperature of about 20° C., at which point para-toluenesulfonylisocyanate (25.0 g, 0.12 mol) was added slowly over a period of time of 1 hour. A milky-white suspension was observed to form. The temperature was maintained with an ice-water bath between 20° C. and 32° C. The reaction mixture was stirred overnight at room temperature before it was concentrated in vacuo at a temperature of 40° C. to yield a white solid that was further dried to constant weight in vacuo at a temperature of 50° C. and a pressure of <1 mTorr.

Benzoyl Dodecylthiourea ("BDDTU") Adduct

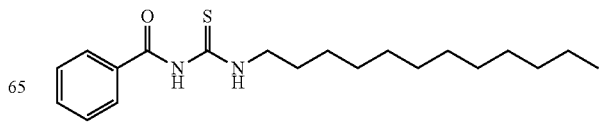

In a 250 mL 3-neck RBF equipped with a condenser, thermo-probe, sealed system nitrogen purge, pressure-equilibrated addition funnel and magnetic stirrer were placed benzoyl isothiocyanate (25.0 g, 0.150 mol) and ethyl acetate (100 mL). The mixture was cooled in an ice-water bath below 5° C., at which point melted dodecylamine (29.3 g, 0.150 mol) (m.p. 30° C.) and ethyl acetate (100 mL) was added slowly over a period of time of 0.5 hours. The ice-water bath was removed and the cloudy solution was stirred at 40° C. under nitrogen purge overnight. The organic phase was separated, washed with water, dried over anhydrous magnesium sulfate, filtered and concentrated in vacuo at a temperature of 40° C. to yield a yellow powdery solid. The solid was dried to constant weight in vacuo at 40° C. and <1 mTorr (99%).

Benzoyl Octadecylthiourea (BODTU) Adduct

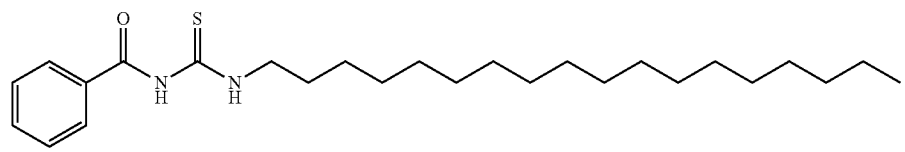 [SMILES: CCCCCCCCCCCCCCCCCCNC(=S)NC(=O)c1ccccc1]

In a 500 mL 3-neck RBF equipped with a condenser, thermo-probe, sealed system nitrogen purge, pressure-equilibrated addition funnel and magnetic stirrer were placed benzoyl isothiocyanate (16.07 g, 96.5 mol) and ethyl acetate (50 mL). The mixture was cooled in an ice-water bath below 5° C., at which point melted octadecylamine (26.5 g, 96.5 mol) (m.p. 55° C.) and ethyl acetate (50 mL) was added slowly over a period of time of 1 hour. The ice-water bath was removed and the cloudy solution was stirred at 50° C. under nitrogen purge overnight. The organic phase was separated, washed with water, dried over anhydrous magnesium sulfate, filtered and concentrated in vacuo at a temperature of 40° C. to yield a pale powdery (waxy) solid. The solid was dried to constant weight in vacuo at 40° C. and <1 mTorr (99%).

Benzoyl Thiourea Adducts Made from Hydroxyl-Containing Compounds

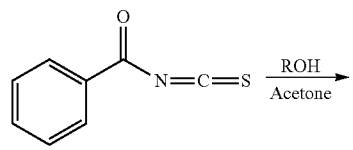

Benzoyl isothiocyanate (1)

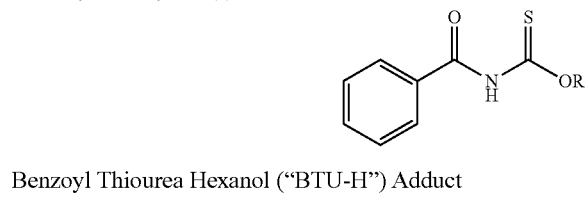

Benzoyl Thiourea Hexanol ("BTU-H") Adduct

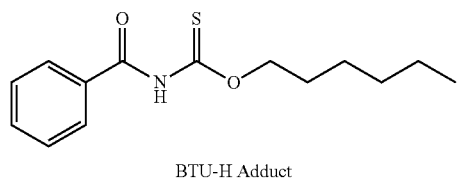 [SMILES: CCCCCCOC(=S)NC(=O)c1ccccc1]

BTU-H Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point hexanol (15.5 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a yellow solid. The solid was dried to constant weight in vacuo at a temperature of 50° C. and a pressure of <1 mTorr in a 83% yield.

Benzoyl Thiourea Hydroxyethyl Methacrylate ("BTU-HEMA") Adduct

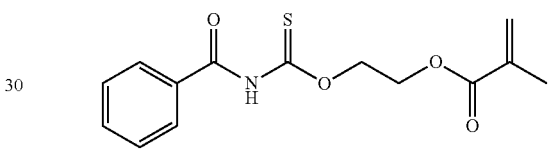

BTU-HEMA Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point hydroxyethyl methacrylate (19.5 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a pale yellow solid. The solid was dried to constant weight in vacuo at a temperature of 50° C. and a pressure of <1 mTorr in a yield of 77%.

Benzoyl Thiourea Water ("BTU-W") Adduct

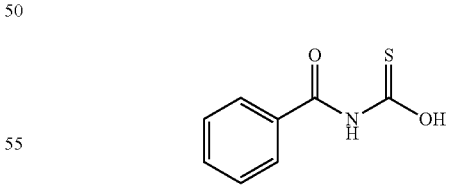

BTU-Water Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point water (2.7 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a pale yellow solid. The solid was dried to constant weight in vacuo at a temperature of 50° C. and a pressure of <1 mTorr in a 36% yield.

Benzoyl Thiourea Cyclohexyl ("BTU-CH") Adduct

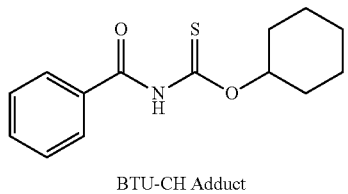 [SMILES: O=C(NC(=S)OC1CCCCC1)c1ccccc1]

BTU-CH Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point cyclohexanol (15.2 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. and then was dried to constant weight in vacuo at a temperature of 50° C. and a pressure of <1 mTorr.

B. Adhesive Formulations

Sample Nos. 1-2 were prepared from the noted components in the listed amounts in Table 1, by mixing with a mechanical stirrer in glass vials. Each sample included a chelator and naphthaquinone as stabilizers.

TABLE 1

| Component | | Sample No./Amt (wt %) | |
|---|---|---|---|
| Type | Identity | 1 | 2 |
| (Meth)acrylate | Proprietary Urethane Methacrylate, Mn ~550 | 68.03 | 68.672 |
| Additives | N,N-Dimethylacrylamide | 17.007 | 17.167 |
| | Acrylic acid | 2.232 | 2.253 |
| | Hydroxyethyl methacrylate, phosphate ester | 0.911 | 0.92 |
| | Stabilizers | 8 | 8 |
| Accelerator | PTSITU | 0.3 | 1.988 |
| Peroxide | t-Butyl perbenzoate (TBPB) | 3.52 | 1 |

Sample Nos. 1 and 2 were applied to each of unprimed steel, stainless steel, and aluminum lap shears with zero induced gap and on unprimed steel lap shears with an induced gap of 20 mil (0.5 mm). The lap shears were mated and the samples allowed to cure for at least 72 hours at room temperature. Adhesion was observed for each set of lap shears and is recorded below. Stability was evaluated for each sample at a temperature of 60° C. and the time at which gelation of each sample was first noted was recorded. Sample No. 1 started to gel at 330 minutes and Sample No. 2 started to gel at 180 minutes. Table 2 shows the adhesive performance in terms of in-lbs.

TABLE 2

| Sample No. | Substrate/Gap | | | |
|---|---|---|---|---|
| | Steel, 0 | Steel, 20 mil | Stainless Steel, 0 | Aluminum, 0 |
| 1 | 968 | 65 | 228 | 314 |
| 2 | 941 | 382 | 274 | 30 |

These results confirm that the cure accelerators are suitable for use in a one part anaerobic adhesive composition, providing suitable strengths on different substrates (even at 20 mil gap) and showing acceptable stability.

What is claimed is:

1. An anaerobic curable composition, comprising:
   (a) a (meth)acrylate component;
   (b) an anaerobic cure-inducing composition comprising a peroxide and a benzoyl thiourea or benzoyl thiourethane compound as an anaerobic cure accelerator within structures I or IA below:

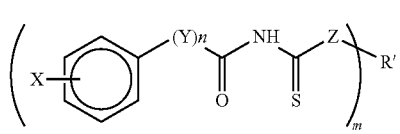

wherein Z is O or N—R, where R is selected from hydrogen, alkyl, alkenyl, aryl, hydroxyalkyl, hydroxyalkenyl, alkylene (meth)acrylate, carbonyl, carboxyl, or sulfonato, and R' taken together form a carbocyclic or hetero atom-containing ring, or R' is a direct bond attaching to the phenyl ring; X is optional, but when present is halogen, alkyl, alkenyl, cycloalkyl, hydroxyalkyl, hydroxyalkenyl, alkoxy, amino, alkylene- or alkenylene-ether, alkylene(meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2;

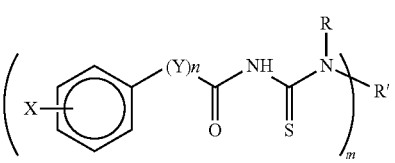

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is optional, but when present is halogen, alkyl, alkenyl, cycloalkyl, hydroxyalkyl, hydroxyalkenyl, alkoxy, amino, alkylene- or alkenylene-ether, alkylene(meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

2. The composition of claim 1, wherein the anaerobic cure accelerator is within structure II or IIA below:

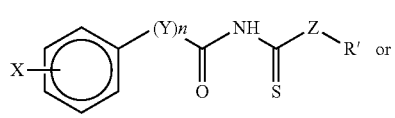

-continued

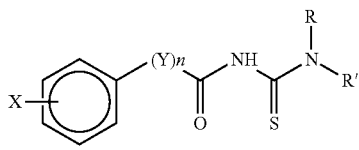

wherein R, R', X, Y, and n are as defined above.

3. The composition of claim 1, wherein the anaerobic cure accelerator is within structure III or IV below:

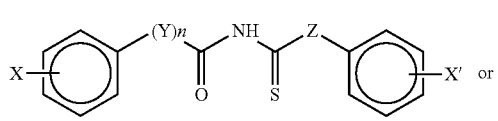

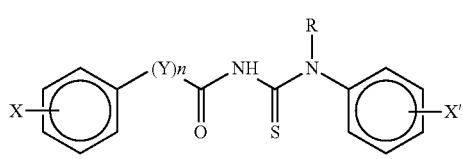

wherein R, X, Y, and n are as defined above, and X' is defined as X.

4. The composition according to claim 1, wherein the (meth)acrylate component is represented by $H_2C=CGCO_2R^1$, wherein G is a member selected from the group consisting of H and alkyl having from 1 to about four carbon atoms, and $R^1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

5. The composition according to claim 1, wherein the (meth)acrylate component is a member selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran(meth)acrylates and di(meth)acrylates, hydroxypropyl(meth)acrylate, hexanediol di(meth)acrylate, and trimethylol propane tri(meth)acrylate.

6. The composition according to claim 1, further comprising an additional accelerator.

7. The composition according to claim 6, wherein the additional accelerator is saccharin.

8. Reaction products of the composition according to claim 1.

9. A process for preparing a reaction product from an anaerobic curable composition, comprising the steps of:

apply an anaerobic curable composition according to claim 1, to a desired substrate surface and
exposing the composition to an anaerobic environment for a time sufficient to cure the composition.

10. A method of preparing an anaerobic curable composition, comprising the step of:
mixing together:
a (meth)acrylate component,
an anaerobic cure inducing composition and
as an anaerobic cure accelerator a benzoyl thiourea or benzoyl thiourethane compound within structures I or IA

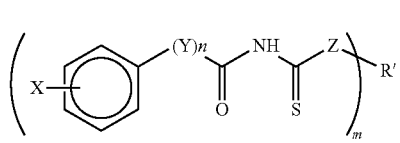

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is optional, but when present is halogen, alkyl, alkenyl, cycloalkyl, hydroxyalkyl, hydroxyalkenyl, alkoxy, amino, alkylene- or alkenylene-ether, alkylene(meth)acrylate, carbonyl, carboxyl, nitroso, sulfonate, hydroxyl or haloalkyl; and Y is —$SO_2NH$—, —CONH—, —NH—, and —PO(NHCONHCSNH$_2$)NH—; and n is 0 or 1 and m is 1 or 2, or

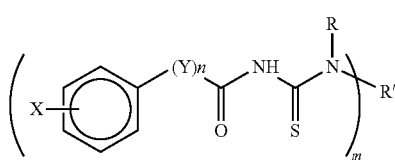

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is optional, but when present is halogen, alkyl, alkenyl, cycloalkyl, hydroxyalkyl, hydroxyalkenyl, alkoxy, amino, alkylene- or alkenylene-ether, alkylene(meth)acrylate, carbonyl, carboxyl, nitroso, sulfonate, hydroxyl or haloalkyl; and Y is —$SO_2NH$—, —CONH—, —NH—, and —PO(NHCONHCSNH$_2$)NH—; and n is 0 or 1 and m is 1 or 2.

11. A composition comprising a bond formed between two mated substrates with the composition of claim 1.

12. The composition of claim 1, wherein the anaerobic cure accelerator is at least one of:

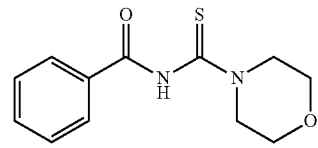

Benzoyl morpholinethiourea (BMTU)

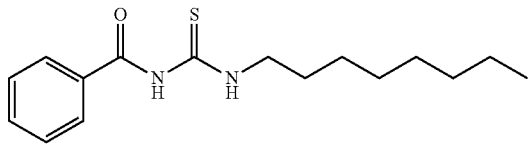

Benzoyl octylthiourea (BOTU)

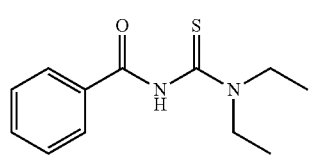
Benzoyl thiodiethylurea (BTDEU)

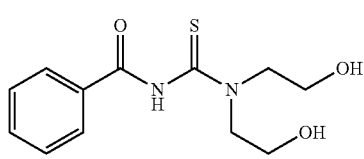
Benzoyl thiodihydroxyethylurea (BTDHEU)

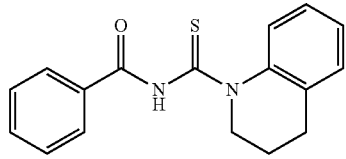
Benzoyl tetrahydroquinoline thiourea (BTHQTU)

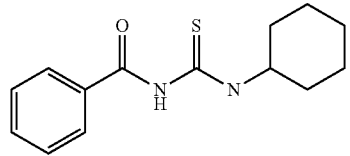
Benzoyl cycohexylthiourea (BCHTU)

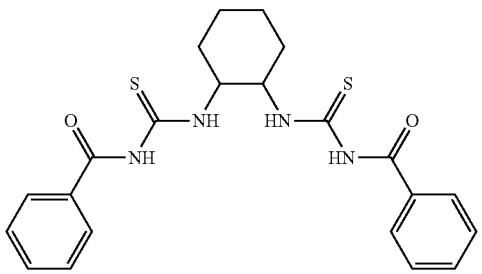
Cyclo bis-Benzoylthiourea (CH bis-BTU)

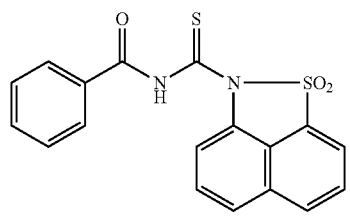
Benzoyl napthosultam thiourea (BNSTU)

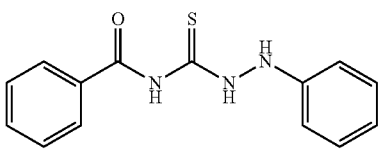
Benzoyl phenylhydrazide thiourea (BPHTU)

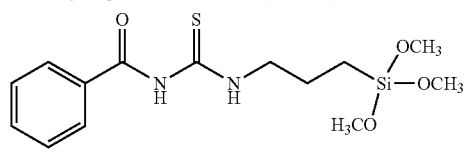
Benzoyl thiourea propyl trimethoxysilane (BTU-PTS)

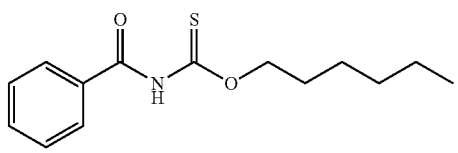
BTU-H Adduct

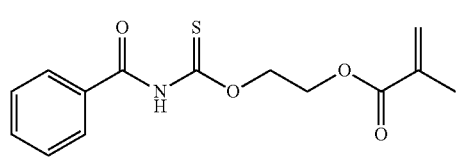
BTU-HEMA Adduct

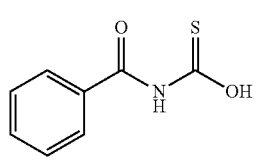
BTU-Water Adduct

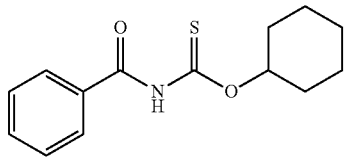
BTU-CH Adduct

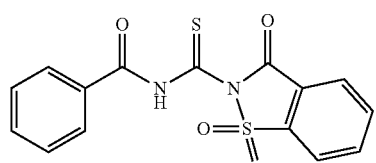
Benzoyl saccharinthiourea (BTU-BS)

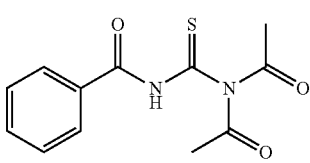
Benzoyl diacetamide urea (BDU)

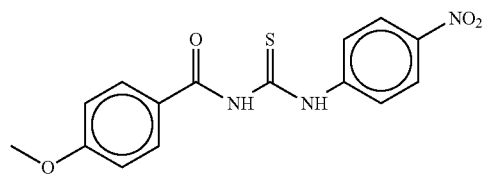

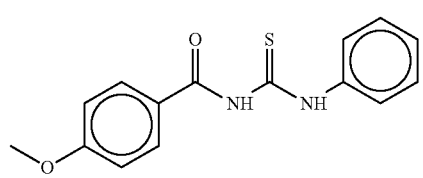

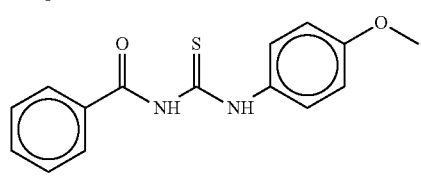

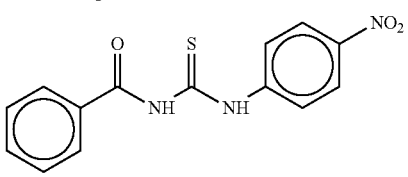

-continued

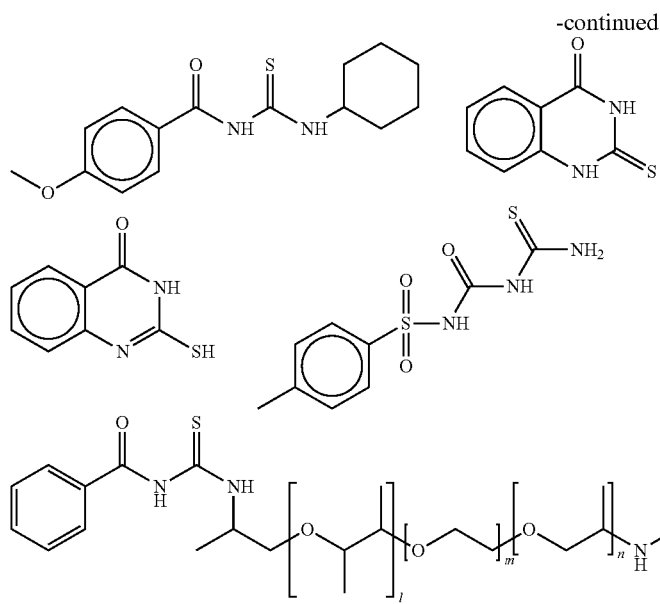
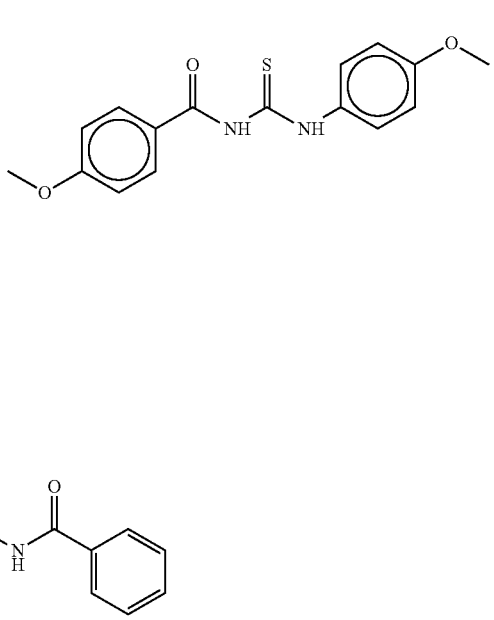

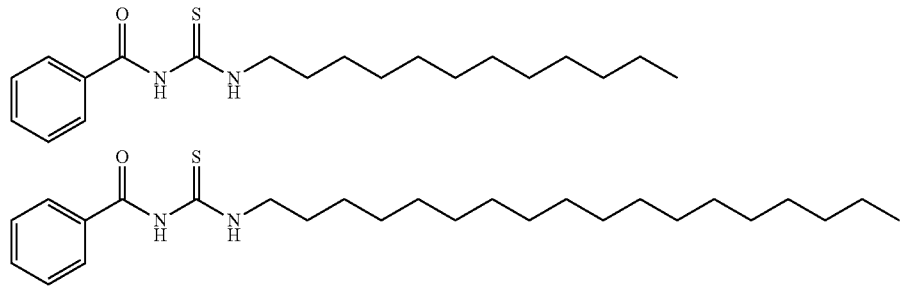

BTU Jeffamine ED-900 Adduct

13. The composition of claim 1, wherein the peroxide is selected from the group consisting of cumene hydroperoxide, para-menthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane, and combinations thereof.

* * * * *